(12) United States Patent
Joo

(10) Patent No.: US 6,288,746 B1
(45) Date of Patent: Sep. 11, 2001

(54) IMAGE FORMAT CONVERTING APPARATUS AND METHODS IN VIDEO SIGNAL PROCESSING SYSTEM

(75) Inventor: Jin-Tae Joo, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/120,177

(22) Filed: Jul. 22, 1998

(30) Foreign Application Priority Data

Aug. 7, 1997 (KR) .................................................. 97-37670

(51) Int. Cl.$^7$ .................................................. H04N 11/20
(52) U.S. Cl. ............................................ 348/453; 348/445
(58) Field of Search .................................... 348/441, 448, 348/445, 453, 452, 451, 458, 578, 581, 571, 556, 555, 561; 345/127, 131, 132, 154; H04N 7/01, 11/20

(56) References Cited

U.S. PATENT DOCUMENTS

| | | | |
|---|---|---|---|
| 5,459,477 | * 10/1995 | Fukuda et al. ........................... | 345/1 |
| 5,534,934 | * 7/1996 | Katsumata et al. ................... | 348/445 |
| 5,646,696 | * 7/1997 | Sprague ................................ | 348/458 |
| 5,864,367 | * 1/1999 | Clatanoff et al. .................... | 348/441 |
| 5,963,262 | * 10/1999 | Ke et al. ................................ | 348/447 |

* cited by examiner

*Primary Examiner*—Michael Lee
(74) *Attorney, Agent, or Firm*—Sughrue, Mion, Zinn, Macpeak & Seas, PLLC

(57) ABSTRACT

An apparatus for converting image format and methods thereof in a video signal processing system. The apparatus includes an analog-to-digital converting unit for sampling original color signals at predetermined intervals and converting the sampled signals into digital signals; a color-space converting unit for converting a digital signal of the analog-to-digital converting unit into a brightness signal and a color tone signal and for outputting these signals; a storage unit for storing a look-up table representing linear interpolation coefficients converted in response to a conversion of an image size; a horizontal scaling unit for linearly interpolating one cycle of the brightness signal and color tone signal in response to a conversion of image size with reference to the look-up table of the storage unit, and for horizontally scaling by repeatedly outputting the outcome linearly-interpolated; a line memory unit for momentarily storing a horizontally scaled signal by the horizontal scaling unit; a vertical scaling unit for interpolating a cycle of a horizontal scaling signal provided by the line memory unit in response to the conversion of the image size with reference to the look-up table, thereby vertically scaling by repeatedly outputting the linearly interpolated data; and a frame memory unit for storing signals vertically and horizontally-scaled by the vertical scaling unit and for converting vertical and horizontal frequencies of the vertical and horizontal scaled signals.

7 Claims, 3 Drawing Sheets n: INPUT SEQUENCE, m: OUTPUT SEQUENCE

IMAGE FORMAT CONVERTING APPARATUS AND METHODS IN VIDEO SIGNAL PROCESSING SYSTEM

BACKGROUND OF THE INVENTION

1. Field of the Invention

The present invention relates to an apparatus for converting image format and methods thereof in a video signal processing system, and more particularly, to an image format converting apparatus and methods thereof by which a converted image of first-rate quality is realized when horizontal and vertical dimensions of an image are converted at any rate and at the same time, and the amount of hardware and computation necessary for an image conversion can be reduced.

2. Description of the Related Art

Generally, the term "multimedia" refers to a system which can transmit information relating to characters, pictures, audio and the like and is applied to televisions, computers, videophones, and the like.

It is necessary to convert the format of a video signal during interface processing in multimedia applications in which systems of different types are combined together into a system. Such combinations could include a personal computer connected to another personal computer, a personal computer connected to a television, a television connected to a television, etc.

An example of such image format conversion is conversion of an image from 500×400 resolution to 300×300 resolution; in this case, the horizontal scale-down ratio is 5 to 3 and the vertical scale-down ratio is 4 to 3.

This is basically achieved by converting such time factors as horizontal and vertical frequency, pixel frequency and the like and such dimensional factors as the horizontal and vertical size of an image.

Then the time factor-conversion is realized by using a memory buffer and the dimensional factor-conversion is realized by using filters.

For example, when five image samples are input in order to scale down an image in the ratio of 5 to 3, three image samples have to be produced.

According to the conventional format-converting method, the number of samples is interpolated by 3 to be increased by a factor of three, and then is decimated by 5 to be decreased by a factor of 1/5.

Using this process, interpolations and decimations each have to be carried out more than 30 times.

Meanwhile, according to the conventional image format-conversion method using hardware, lines (verticality) or pixels (horizontality) are skipped at predetermined intervals to scale down the image in size, and lines (verticality) or pixels (horizontality) are folded at predetermined intervals to scale up the image in size.

Such conventional methods allow the hardware to be easily realized, but there is a problem in that the image appears coarse, and in particular, characters appear broken in the case where a PC image containing many characters is scaled-down.

Conventional methods require a filter having a number of taps to prevent the quality of an image from deteriorating when converting image format; n-1 line memory units are needed when a filter having n taps is used for scaling in a vertical direction.

Accordingly, there is a disadvantage with the conventional method thus performed because it is expensive to manufacture hardware capable of providing a high quality image when performing an image format conversion.

SUMMARY OF THE INVENTION

Accordingly, the present invention is provided to solve the aforementioned problem and it is an object of the present invention to provide an apparatus for converting an image format and methods thereof in video-signal processing systems in which a space-position in one cycle is computed in advance by using periodicity of input sequence and output sequence and the outcome resulting from the computation is repeatedly applied, so that a converted image of good quality is obtained, and at the same time, an amount of computation and size of the hardware can be reduced.

In accordance with the object of the present invention, there is provided an apparatus, comprising: an analog-to-digital converting unit for sampling original color signals at predetermined intervals and converting the sampled signals into digital signals; a color-space converting unit for converting a digital signal of the analog-to-digital converting unit into a brightness signal and a color tone signal and for outputting it; a storage unit for storing a look-up table representing linear interpolation coefficients converted in response to a conversion of an image size; a horizontal scaling unit for linearly interpolating one cycle of the brightness signal and color tone signal in response to a conversion of image size with reference to the look-up table of the storage unit, and for horizontally scaling by repeatedly outputting the outcome linearly-interpolated; a line memory unit for momentarily storing a horizontally scaled signal by the horizontal scaling unit; a vertical scaling unit for interpolating a cycle of a horizontal scaling signal provided by the line memory unit in response to the conversion of the image size with reference to the look-up table, thereby vertically scaling by repeatedly outputting the linearly interpolated data; and a frame memory unit for storing signals vertically and horizontally-scaled by the vertical scaling unit and for converting vertical and horizontal frequencies of the vertical and horizontal scaled signals.

In accordance with the object of the present invention, there is provided a method comprising the steps of: sampling each of original color signals at predetermined intervals and converting the sampled signals into digital signals; converting the digital signals transformed by the analog-to-digital converting unit into a brightness signal and a color tone signal; linearly-interpolating one cycle of the brightness and color tone signals in response to conversion of an image size with reference to a look-up table provided with linear-interpolated coefficients and horizontally-scaling by using repeatedly the linearly-interpolated data; vertically scaling the horizontally scaled signals with reference to the look-up table; and storing the vertically and horizontally scaled signals in a frame memory unit and converting vertical and horizontal frequencies of the vertically and horizontally scaled signals.

BRIEF DESCRIPTION OF THE DRAWINGS

For a fuller understanding of the nature and object of the invention, reference should be made to the following detailed description taken in conjunction with the accompanying drawings in which.

DETAILED DESCRIPTION OF THE PREFERRED EMBODIMENT

Figure 1:
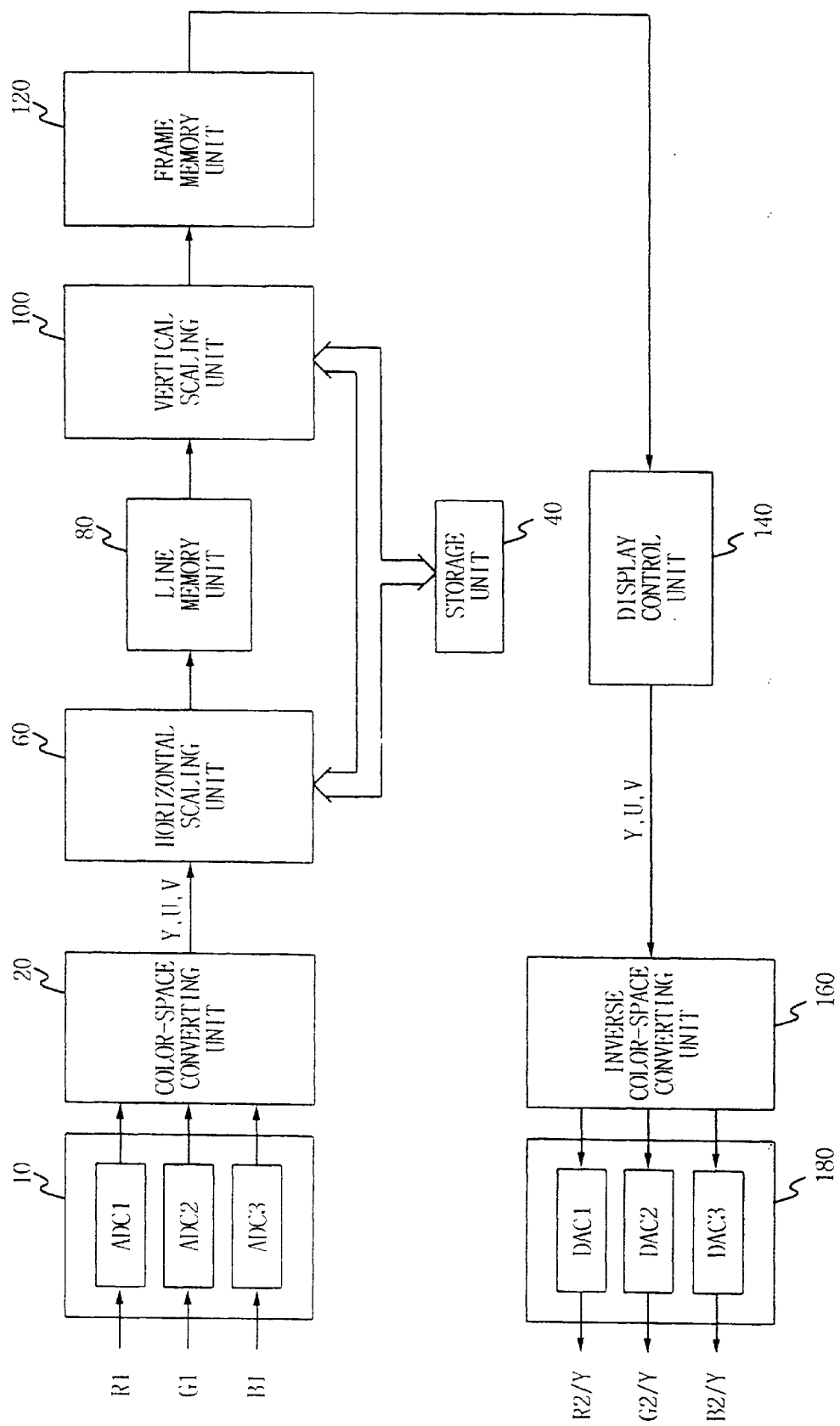
FIG. 1 shows a block diagram for illustrating an image format converting apparatus according to the present invention.

The preferred embodiment of the present invention will now be described in detail with reference to the accompanying drawings.

Throughout the drawings, like reference numerals and nomenclature are used for designation of like or equivalent parts or portions for simplicity of illustration and explanation.

As shown in FIG. 1, according to the present invention, the image format converting apparatus comprises an analog-to-digital converting unit 10, a color-space converting unit 20, a storage unit 40, a horizontal scaling unit 60, a line memory unit 80, a vertical scaling unit 100, and a frame memory unit 120.

The analog-to-digital converting unit 10 samples original color signals at predetermined intervals and convert the sampled signals into digital signals to output.

The color-space converting unit 20 converts a digital signal of the analog-to-digital converting unit 10 into a brightness signal Y and color tone signals U and V and outputs these signals. The storage unit 40 is provided with a look-up table representing linear interpolation coefficients transformed in response to a conversion of an image size.

The horizontal scaling unit 60 linearly interpolates one cycle of the brightness signal Y and color tone signals U and V in response to conversion of an image size with reference to the look-up table of the storage unit 40, and horizontally scales the linearly-interpolated outcome by repeatedly outputting it.

The line memory unit 80 momentarily stores the signal horizontally scaled by the horizontal scaling unit 60.

The vertical scaling unit 100 linearly interpolates a cycle of a horizontal scaling signal provided by the line memory unit 80 in response to the conversion of the image size with reference to the look-up table, thereby vertically scaling by repeatedly outputting the linearly-interpolated data.

The frame memory unit 120 stores the vertically and horizontally-scaled signals provided by the vertical scaling unit 100 and converts the vertical and horizontal frequencies of the vertically and horizontally-scaled signals.

Meanwhile, reference numeral 140 in FIG. 1 represents a display control unit for enlarging a scaled-down image, reference numeral 160 indicates an inverse color-space converting unit for converting the brightness signal Y and color tone signals U and V into the digital original color signals, and reference numeral 180 represents the digital-to-analog converting unit for converting the digital original color signals into the analog original color signals R2/Y, G2/U and B2/V.

The digital-to-analog converting unit 180 includes first, second and third digital-to-analog converters DAC1, DAC2 and DAC3.

Now, the operation of the apparatus thus constructed will be described in accordance with a preferred embodiment.

Referring to FIG. 1, according to the present invention, the original color signals R1, G1 and B1 of video signals are input to the analog-to-digital converting unit 10, which samples each of the original color signals R1, G1 and B1 at predetermined intervals the first, second and third analog-to-digital converters ADC1, ADC2 and ADC3 convert the sampled signals into digital signals and output the digital signals to the color space converting unit 20.

Then, the color space converting unit 20 converts the digital signals provided by the analog-to-digital converting unit 10 into the brightness signal Y and color tone signals U and V and outputs these signals.

Accordingly, the number of samples can be reduced by half and an amount of computation for color tone signal can be reduced, and the size of the memory hardware can be reduced by half.

Meanwhile, the storage unit 40 is provided with a look-up table which is represented by the linear interpolation coefficients K/L according to the size of the image. Such a storage unit 40 can be realized by ROM (Read Only Memory).

The horizontal scaling unit 60 according to the present embodiment linearly interpolates one cycle of the brightness signal and the color tone signal according to the image size transformation with reference to the look-up table of the storage unit 40, and horizontally scales the linearly interpolated output by repeatedly outputting it.

The horizontal scaling signal which is output by the horizontal scaling unit 60 is alternately transmitted to two line memories which are included in the line memory unit 80 for momentarily storing data.

The vertical scaling unit 100 linearly interpolates one cycle of the horizontal scaling signal provided by the line memory unit 80 according to the image size transformation by referring to the look-up table of the storage unit 40 in a manner similar to the horizontal scaling unit 60, and repeatedly outputs the linearly interpolated output to vertically scale it.

The vertically scaled signal which is output by the vertical scaling unit 100 is stored in the frame memory unit 120.

And then, the frame memory unit 120 stores the vertically and horizontally scaled signals provided by the vertical scaling unit 100 and converts the vertical and horizontal frequencies of the vertically and horizontally scaled signals.

Such an image scaled-down to a predetermined size is converted to a format-converted image through the display control unit 140, the inverse color space converting unit 160 and the digital-to-analog converting unit 180.

Figure 2:
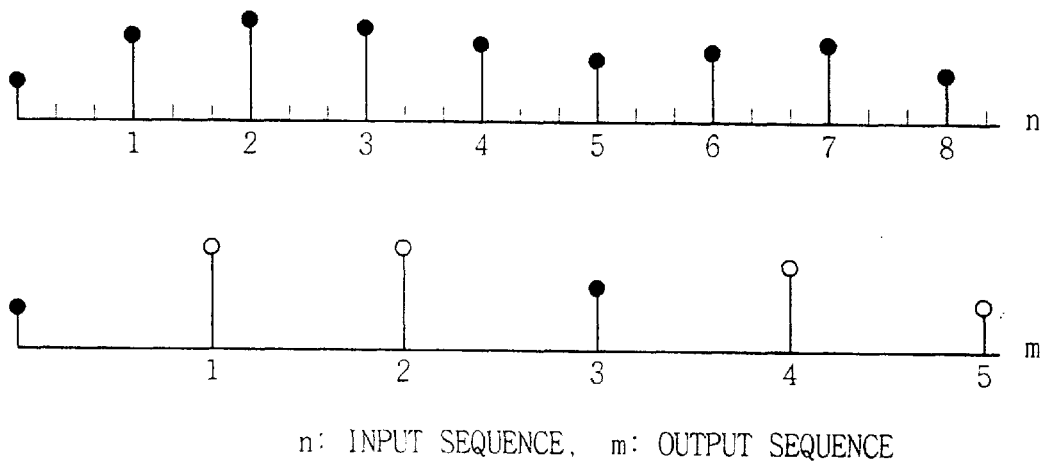
FIG. 2 shows a drawing for illustrating an image format converting method according to the present invention.

FIG. 2 shows a method for converting an image format according to the present invention. An image format which is converted in a horizontal direction only, as shown in FIG. 2, will be considered for the sake of simplicity.

The drawing designates periodicity and position of the preceding and the following scaled-down image on lines of the brightness signal Y and color tone signals U and V. Also, FIG. 2 indicates an image scaled-down at the ratio of 5 to 3.

As shown in FIG. 2, a) m(0) is equal to n(0), b) m(1) is equal to $n(1)+\{n(2)-n(1)\}\times 2/3$ according to the linear interpolation, c) m(2) is equal to $n(3)+\{n(4)-n(3)\}\times 1/3$, and d) there is no sample to be output, when n=1 and n=3.

Accordingly, such linear interpolation coefficients as 2/3 and 1/3 represented in b) and c), and such n value as 1 and 3 represented in d) are repeatedly applied by its periodicity, so that these values are computed in advance and provided in the look-up table of the storage unit 40.

Figure 3:
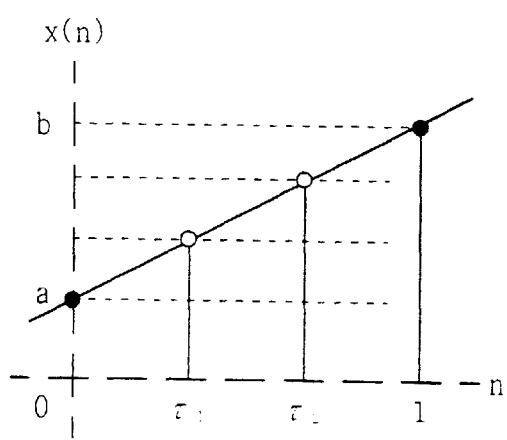
FIG. 3 shows a drawing for illustrating a linear interpolation of an image format according to the present invention.

FIG. 3 is a drawing for illustrating a linear interpolation of an image format according to the present invention.

Referring to the drawing, the horizontal scaling unit 60 and the vertical scaling unit 100 are used to compute a spatial position of an output sequence compared with an input sequence based on the following equation, with reference to the linear interpolation coefficients provided in the look-up table for performing a linear interpolation of variable coefficients:

$$X(\tau k)=a+(b-a)K/L, (K=1, 2, \ldots L-1)$$

where, a is an initial sampling value within one cycle, b is a final sampling value within one cycle, K/L is a linear interpolation coefficient, and K is the odd value of m X M/L, (m: output sequence, L: interpolation factor and M: decimation factor).

Figure 4:
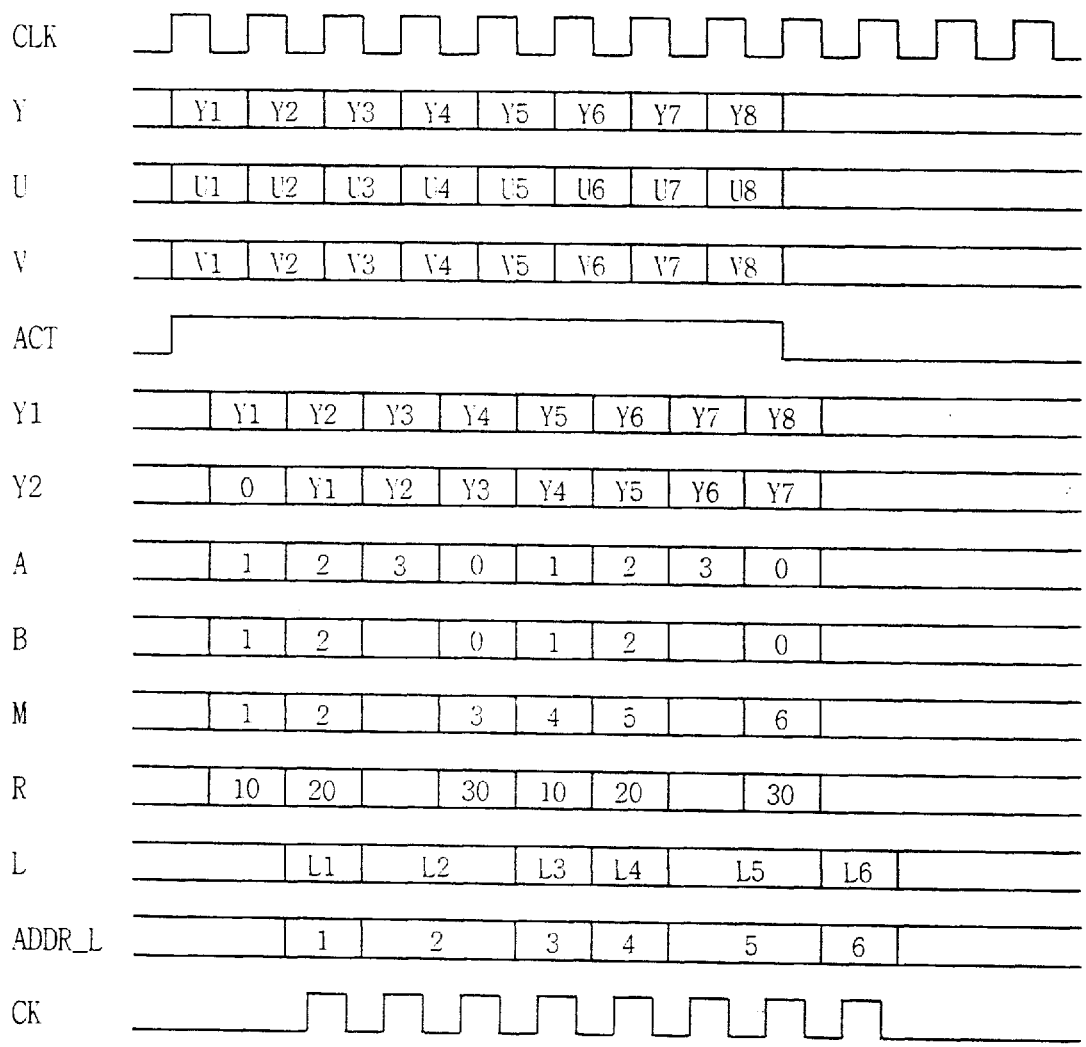
FIG. 4 shows a timing chart of a horizontal scaling unit illustrated in FIG. 1.

FIG. 4 is a timing chart illustrating the image format conversion of the ratio of 4 to 3 which is performed by the horizontal scaling unit as shown in FIG. 1, where n=2.

As shown in FIG. 4, the color space converting unit 20 synchronizes the edge of the pixel clock (CLK) and to transmit the image samples Y, U and V, which are the converted brightness signal and color tone signals, to the horizontal scaling unit 60 in the active video block.

In FIG. 4, Y2 represents the delayed value of Y1, and a blank signifies that there is no output sample.

The letter "A" indicates the periodicity of the input sequence, B designates an address of the storage unit 40, R represents the linear interpolation coefficient computed by the storage unit 40, L Nils represents the output sample computed with Y1, Y2 and R, and the letter "M" indicates an address of the line memory for allowing the output sample to be stored.

The hardware used for converting the image format according to the present embodiment may have, for example, a 2-tap filter having a variable coefficient instead of a constant coefficient, and the amount of computation is remarkably reduced because one output-sample can be computed by performing one multiplication operation and two addition operations. Also, two resistors for a horizontal direction and two line memories for a vertical direction are sufficient to perform the computation.

As is apparent from the foregoing, there is an advantage in the present invention in that a spatial position of the output sequence within one cycle can be computed in advance by using the periodicity of the spatial position of the input and output sequences, and the amount of computation and the size of the hardware can be reduced by repeatedly applying the computed output, thereby allowing manufacturing costs to be reduced while maintaining an image of a high quality when converting the image format.

What is claimed is:

1. An apparatus for converting an image format in a video signal processing system, comprising:

an analog-to-digital converting unit for sampling each of original color signals at predetermined intervals and converting the sampled signals into digital signals and outputting the converted digital signals;

a color-space converting unit for converting the digital signals output by the analog-to-digital converting unit into a brightness signal and a color tone signal and outputting the converted signals;

a storage unit for storing a look-up table representing variable linear interpolation coefficients converted in response to a conversion of an image size;

a horizontal scaling unit for linearly interpolating one cycle of the brightness signal and the color tone signal in response to a conversion of the image size with reference to the look-up table of the storage unit, and for horizontally scaling by repeatedly outputting the horizontally scaled linearly-interpolated output;

a line memory unit for momentarily storing a horizontally scaled signal output by the horizontal scaling unit;

a vertical scaling unit for interpolating a cycle of the horizontally scaled signal provided by the line memory unit in response to the conversion of the image size with reference to the look-up table, thereby vertically scaling the horizontally scaled signal by repeatedly outputting the vertically scaled linearly interpolated data; and a frame memory unit for storing signals vertically and horizontally-scaled output by the vertical scaling unit and for converting vertical and horizontal frequencies of the vertically scaled signals.

2. The apparatus for converting an image format in a video signal processing system as defined in claim 1, wherein the analog-to-digital converting unit comprises a three analog-to-digital converters for respectively converting each of three of the original color signals into the digital signals.

3. An apparatus for converting an image format in a video signal processing system, comprising:

an analog-to-digital converting unit for sampling each of original color signals at predetermined intervals and converting the sampled signals into digital signals and outputting the converted digital signals;

a color-space converting unit for converting the digital signals output by the analog-to-digital converting unit into a brightness signal and a color tone signal and outputting output the converted signals;

a storage unit for storing a look-up table representing linear interpolation coefficients converted in response to a conversion of an image size;

a horizontal scaling unit for linearly interpolating one cycle of the brightness signal and the color tone signal in response to a conversion of the image size with reference to the look-up table of the storage unit, and for horizontally scaling by repeatedly outputting the horizontally scaled linearly-interpolated output;

a line memory unit for momentarily storing a horizontally scaled signal output by the horizontal scaling unit;

a vertical scaling unit for interpolating a cycle of the horizontally scaled signal provided by the line memory unit in response to the conversion of the image size with reference to the look-up table, thereby vertically scaling the horizontally scaled signal by repeatedly outputting the vertically scaled linearly interpolated data; and a frame memory unit for storing signals vertically and horizontally scaled output by the vertical scaling unit and for converting vertical and horizontal frequencies of the vertically scaled signals, wherein the vertical scaling unit computes a spatial position of an output sequence based on the following equation, by referring to the linear interpolation coefficients provided in the look-up table for performing a linear interpolation of variable coefficients;

$$X(\tau k)=a+(b-a)K/L, (K=1, 2, \ldots L-1)$$

where, a is an initial sampling value within one cycle, b is a final sampling value within one cycle, K/L is a linear interpolation coefficient, and K is the odd value of m X M/L, (m: output sequence, L: interpolation factor and M: decimation factor).

4. An apparatus for converting an image format in a video signal processing system, comprising:

an analog-to-digital converting unit for sampling each of original color signals at predetermined intervals and converting the sampled signals into digital signals and outputting the converted digital signals;

a color-space converting unit for converting the digital signals output by the analog-to-digital converting unit into a brightness signal and a color tone signal and outputting output the converted signals;

a storage unit for storing a look-up table representing linear interpolation coefficients converted in response to a conversion of an image size;

a horizontal scaling unit for linearly interpolating one cycle of the brightness signal and the color tone signal in response to a conversion of the image size with reference to the look-up table of the storage unit and for horizontally scaling by repeatedly outputting the horizontally scaled linearly-internolated output;

a line memory unit for momentarily storing a horizontally scaled signal output by the horizontal scaling unit;

a vertical scaling unit for interpolating a cycle of the horizontally scaled signal provided by the line memory unit in response to the conversion of the image size with reference to the look-up table, thereby vertically scaling the horizontally scaled signal by repeatedly outputting the vertically scaled linearly interpolated data; and a frame memory unit for storing signals vertically and horizontally scaled output by the vertical scaling unit and for converting vertical and horizontal frequencies of the vertically scaled signals, wherein the horizontal scaling unit computes a spatial position of an output sequence based on the following equation, by referring to the linear interpolation coefficients provided in the look-up table for performing a linear interpolation of variable coefficients:

$$X(\tau k)=a+(b-a)K/L, K=1, 2, \ldots L-1)$$

where, a is an initial sampling value within one cycle, b is a final sampling value within one cycle, K/L is a linear interpolation coefficient, and K is the odd value of m X M/L, (m: output sequence, L: interpolation factor and M: decimation factor).

5. A method for converting an image format in a video signal processing system comprising the steps of:

sampling each of original color signals at predetermined intervals and converting the sampled signals into digital signals;

converting the digital signals into a brightness signal and a color tone signal;

linearly-interpolating one cycle of the brightness and color tone signals according to an image size conversion with reference to a look-up table provided with variable linearly-interpolated-coefficients to produce linearly-interpolated data and horizontally-scaling by using repeatedly the linearly-interpolated data;

vertically-scaling the horizontally scaled signals with reference to the look-up table to produce vertically and horizontally scaled signals; and storing the vertically and horizontally scaled signals in a frame memory unit and converting vertical and horizontal frequencies of the vertically and horizontally scaled signals.

6. A method for converting an image format in a video signal processing system, comprising the steps of:

signaling each of original color signals at predetermined intervals and converting the sampled signals into digital signals;

converting the digital signals into a brightness signal and a color tone signal; linearly-interpolating one cycle of the brightness and color tone signals according to an image size conversion with reference to a look-up table provided with linearly-interpolated coefficients to produce linearly-interpolated data and horizontally-scaling by using repeatedly the linearly-interpolated data;

vertically-scaling the horizontally scaled signals with reference to the look-up table to produce vertically and horizontally scaled signals; and storing the vertically and horizontally scaled signals in a frame memory unit and converting vertical and horizontal frequencies of the vertically and horizontally scaled signals, wherein the horizontal scaling step computes a spatial position of an output sequence based on tie following equation, referring to the linear interpolation coefficients provided in the look-up table for performing a linear interpolation of variable coefficients:

$$X(\tau k)=a+(b-a)K/L, (K=1, 2, \ldots L-1)$$

where, a is an initial sampling value within one cycle, b is a final sampling value within one cycle, K/L is a linear interpolation coefficient, and K is the odd value of m X M/L, (m: output sequence, L: interpolation factor and M: decimation factor).

7. A method for converting an image format in a video signal processing system, comprising the steps of:

sampling each of original color signals at predetermined intervals and converting the sampled signals into digital signals;

converting the digital signals into a brightness signal and a color tone signal;

linearly-interpolating one cycle of the brightness and color tone signals according to an image size conversion with reference to a look-up table provided with linearly-interpolated coefficients to produce linearly-interpolated data and horizontally-scaling by using repeatedly the linearly-interpolated data;

vertically-scaling the horizontally scaled signals with reference to the look-up table to produce vertically and horizontally scaled signals; and storing the vertically and horizontally scaled signals in a frame memory unit and converting vertical and horizontal frequencies of the vertically and horizontally scaled signals, wherein the vertical scaling step computes a spatial position of an output sequence based on the following equation, referring to the linear interpolation coefficients provided in the look-up table for performing a linear interpolation of variable coefficients:

$$X(\tau k)=a+(b-a)K/L, (K=1, 2, \ldots L-1)$$

where, a is an initial sampling value within one cycle, b is a final sampling value within one cycle, K/L is a linear interpolation coefficient, and K is the odd value of m X M/L, (m: output sequence, L: interpolation factor and M: decimation factor).

* * * * *